United States Patent

Shono

[11] Patent Number: 6,067,424
[45] Date of Patent: May 23, 2000

[54] DOUBLE DIAL MECHANISM FOR A CAMERA

[75] Inventor: Tetsuji Shono, Saitama, Japan

[73] Assignee: Asahi Kogaku Kogyo Kabushiki Kaisha, Tokyo, Japan

[21] Appl. No.: 09/165,188

[22] Filed: Oct. 2, 1998

[30] Foreign Application Priority Data

Oct. 3, 1997 [JP] Japan .................................. 9-270881

[51] Int. Cl.$^7$ .................................................. G03B 17/00

[52] U.S. Cl. ........................ 396/297; 396/299; 396/543; 200/336

[58] Field of Search .................................... 396/297, 298, 396/299, 300, 543; 200/7, 9, 14, 18, 302.1, 336, 565

[56] References Cited

U.S. PATENT DOCUMENTS

| 3,839,723 | 10/1974 | Uno ........................................... 396/239 |
| 3,964,082 | 6/1976 | Mita ......................................... 396/299 |
| 4,067,033 | 1/1978 | Urano et al. ............................. 396/299 |
| 4,253,756 | 3/1981 | Kurei et al. .............................. 396/297 |
| 4,853,726 | 8/1989 | Kawamura et al. ..................... 396/299 |
| 5,436,413 | 7/1995 | Katakami .................................. 200/14 |
| 5,761,554 | 6/1998 | Kirigaya et al. ......................... 396/299 |

*Primary Examiner*—Eddie C. Lee
*Attorney, Agent, or Firm*—Greenblum & Bernstein, P.L.C.

[57] ABSTRACT

A double dial mechanism for a camera includes two coaxially-arranged rotatable dials, and two dial rotational position detecting mechanisms. The two dial rotational position detecting mechanisms are respectively arranged at positions that differ in an axial direction and overlap in a radial direction.

11 Claims, 4 Drawing Sheets

DOUBLE DIAL MECHANISM FOR A CAMERA

BACKGROUND OF THE INVENTION

1. Field of the Invention

The present invention relates to a dial mechanism incorporated into a camera. More particularly, the present invention relates to a double dial mechanism in which two dials to be rotated independently from one another during operation are coaxially arranged.

2. Description of the Related Art

In general, cameras are provided with various setting buttons and setting dials for setting photographic and other conditions. In recently developed electronic cameras, a setting system is adopted in which photographic conditions are set using setting buttons. In these systems, the photographic conditions are set while a photographer is looking at marks and numerical values displayed on a display section of the camera, and thus the setting operation is complicated.

In setting dial systems, it is possible to conduct setting only when a rotational position of the setting dial is set at a predetermined position. The setting can be easily conducted. However, from the viewpoint of human engineering, in order to ensure proper operation, a diameter of the dial can not be reduced too much. Accordingly, it is difficult to ensure a space for arranging a plurality of setting dials in the camera body, and the setting dials obstruct the miniaturization of cameras. In order to solve the above problems, there has conventionally been proposed a dial mechanism in which two setting dials are coaxially arranged.

FIGS. 4A and 4B are respectively a cross-sectional view and a schematic plan view showing an example of an arrangement of a primary portion of the dial mechanism. In a portion of the camera body, in this case, on an ornamental plate 101 of a top body panel of the camera body, there is integrally provided a cylindrical boss 111 that protrudes from the ornamental plate 101. Into this cylindrical boss 111, a shaft portion 131 of a shutter dial 103 having a short cylindrical dial knob 132 is inserted. A shutter code plate 133 is fixedly attached to an inner end portion of this shaft portion 131. On a surface of this shutter code plate 133, there is provided a conductor pattern 134 for a shutter composed of a conductive film having a predetermined pattern. A conductive shutter brush 136 attached to a circuit board 102, which is supported by and fixed to the ornamental plate 101, slides on this conductor pattern 134 for controlling the shutter. In this way, the shutter rotation detecting mechanism is composed. When the above shutter dial 103 is rotated during operation, a contact position of the shutter brush 136 with the conductor pattern 134 for controlling the shutter on the shutter code plate 133, which is rotated integrally with the shutter dial 103, is changed. Therefore, a rotational position of the shutter dial 103 is detected as a code value, and a shutter speed is set to correspond with the rotational position of the shutter dial 103.

A disk-shaped photometry dial 104 is rotatably engaged with an outer circumference of the cylindrical boss 111. A protrusion 141 arranged in one portion of the circumference on the reverse side of the photometry dial 104 penetrates an arcuate opening groove 112 formed on the ornamental plate 101 and protrudes inside the ornamental plate 101. A photometry brush 146 is fixedly attached to a forward end of this protrusion 141. This photometry brush 146 is capable of sliding on a photometry conductor pattern 144 on the photometry code plate 143 formed in one portion of the circuit board 102. In this way, the photometry rotational position detecting mechanism is composed. When this photometry dial 104 is rotated during operation, the photometry brush 146 rotated integrally with the photometry dial 104 slides on the photometry conductor pattern 144, so that the contact position is changed, and a rotational position of the photometry dial is detected as a code value. In this way, a photometry condition is set to correspond with the rotational position.

In the above conventional double dial mechanism, the shutter dial 103 and the photometry dial 104 are arranged on the same axis. Accordingly, it is possible to incorporate the two dials in the camera body without using additional space on the camera body. Due to the foregoing, it is possible to miniaturize the camera without deteriorating the operation properties of the dial. However, the code plates 133, 143, respectively composing the rotational position detecting mechanisms for the shutter and photometry and the brushes 136, 146 are arranged on substantially the same plane. Therefore, in order to prevent the interference between each of the code plates 133, 143 and brushes 136, 146, it is necessary to arrange them at different positions in the radial direction. As a result, a space occupied by the rotational position detecting mechanism is increased. For the above reasons, even if the above double dial mechanism is adopted for the purpose of reducing space, miniaturization can not be sufficiently accomplished.

In the above conventional double dial mechanism, the photometry brush 146 arranged inside the ornamental plate 101 is slid on the code plate 143 for photometry. Therefore, it is necessary to form in the ornamental plate 101 an arcuate opening groove 112 into which a protrusion 141 of the photometry dial 104 is inserted. Since water can enter the camera body from this opening groove 112, not only is the water proofing property of the photometry brush 146 deteriorated, but so is the water proofing property of the entire camera. To make matters worse, when the opening groove 112 is formed, the mechanical strength in this region of the camera body is decreased. Since there are water proofing and mechanical strength problems as described above, an arc length of the opening groove 112 is necessarily restricted. As a result, a rotational angel of the photometry dial is also restricted, and it becomes difficult to ensure a rotational angle required for changing the photometry condition.

SUMMARY OF THE INVENTION

It is an object of the present invention to provide a double dial mechanism capable of ensuring a required rotational operation angle without deteriorating the water property and mechanical strength of the camera, while simultaneously miniaturizing the camera.

The present invention provides a double dial mechanism for a camera comprising first and second coaxially-arranged rotatable dials, and first and second dial rotational position detecting mechanisms. The first and second dial rotational position detecting mechanisms are respectively arranged at positions that differ in an axial direction and overlap in a radial direction.

The double dial mechanism further comprises an opening window being formed in a camera body, a support base plate being integrally supported inside the camera body and closing the opening window, a cylindrical boss protruding from the support base plate through the opening window, a first dial having a shaft portion being inserted into and supported by the cylindrical boss, a second dial engaging with an outer circumference of the cylindrical boss, and a sealing member sealing a circumference of the opening window and being arranged between the second dial and the camera body. The first rotational position detecting mechanism is arranged at an inner end portion of the shaft portion of the first dial, and the second rotational position detecting mechanism is arranged between the second dial and the support base plate.

When the rotational position detecting mechanisms of two dials are arranged at positions that are different from each other in the axial direction and overlap each other in the radial direction, it is possible to reduce a space which is occupied by the double dial mechanism incorporated into a camera. Accordingly, the size of the camera can be reduced. When two dials are supported by the support base plate which closes an opening window formed in the camera body, and when the rotational position detecting mechanisms of the respective dials are installed, it is not necessary to form an opening for driving the rotational position detecting mechanism on the camera body. Therefore, both the mechanical strength and the water proofing property of the camera can be enhanced.

DETAILED DESCRIPTION OF THE PREFERRED EMBODIMENT

Figure 1:
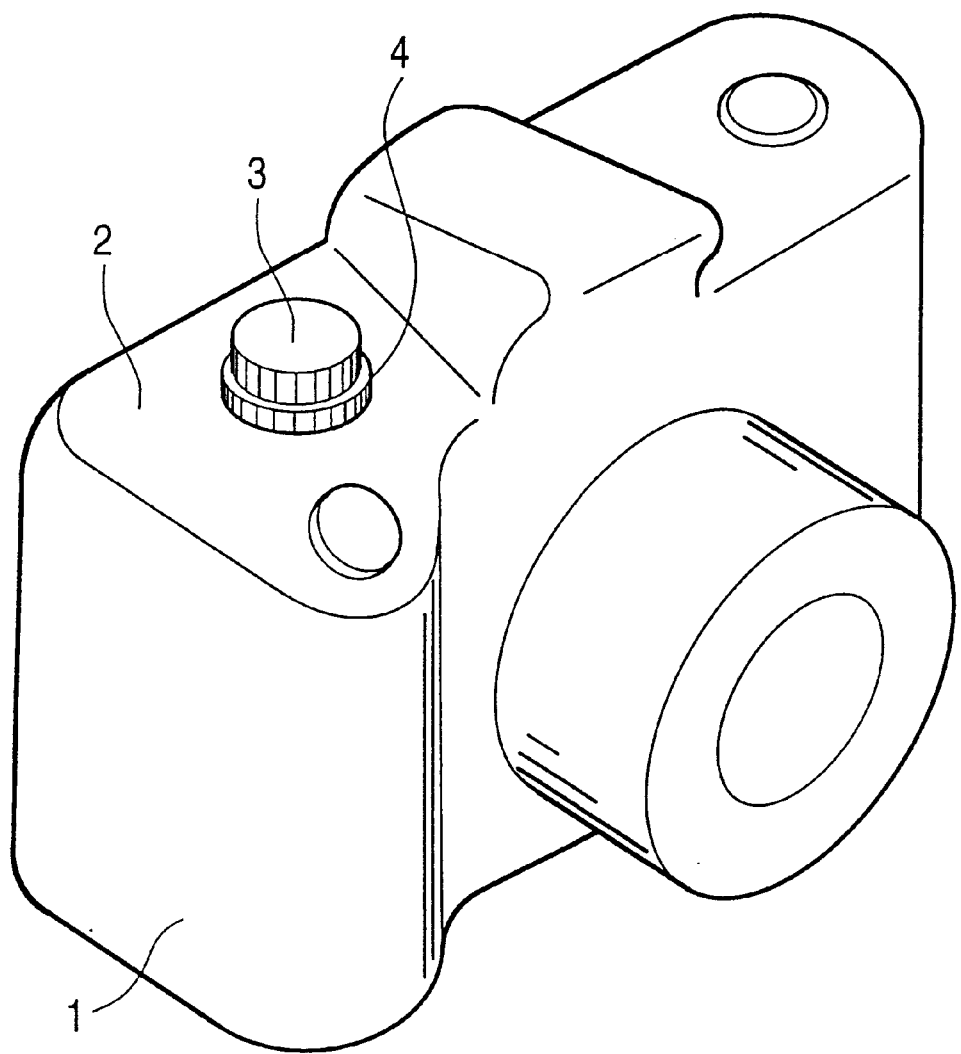
FIG. 1 is a perspective view of a camera to which the double dial mechanism of the present invention is applied.
Figure 2:
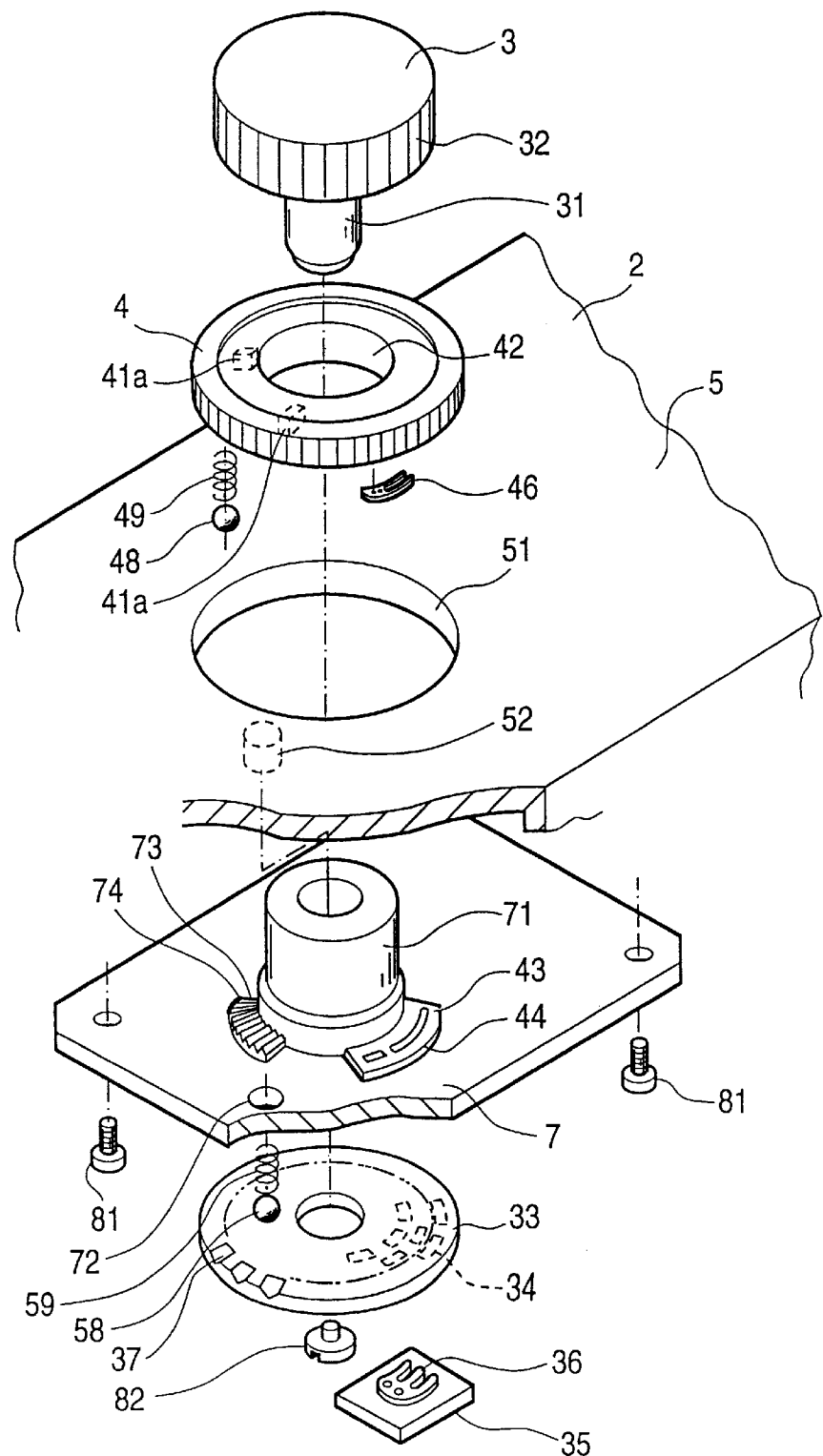
FIG. 2 is an exploded perspective view of a primary portion of the double dial mechanism of the present invention.
Figure 3:
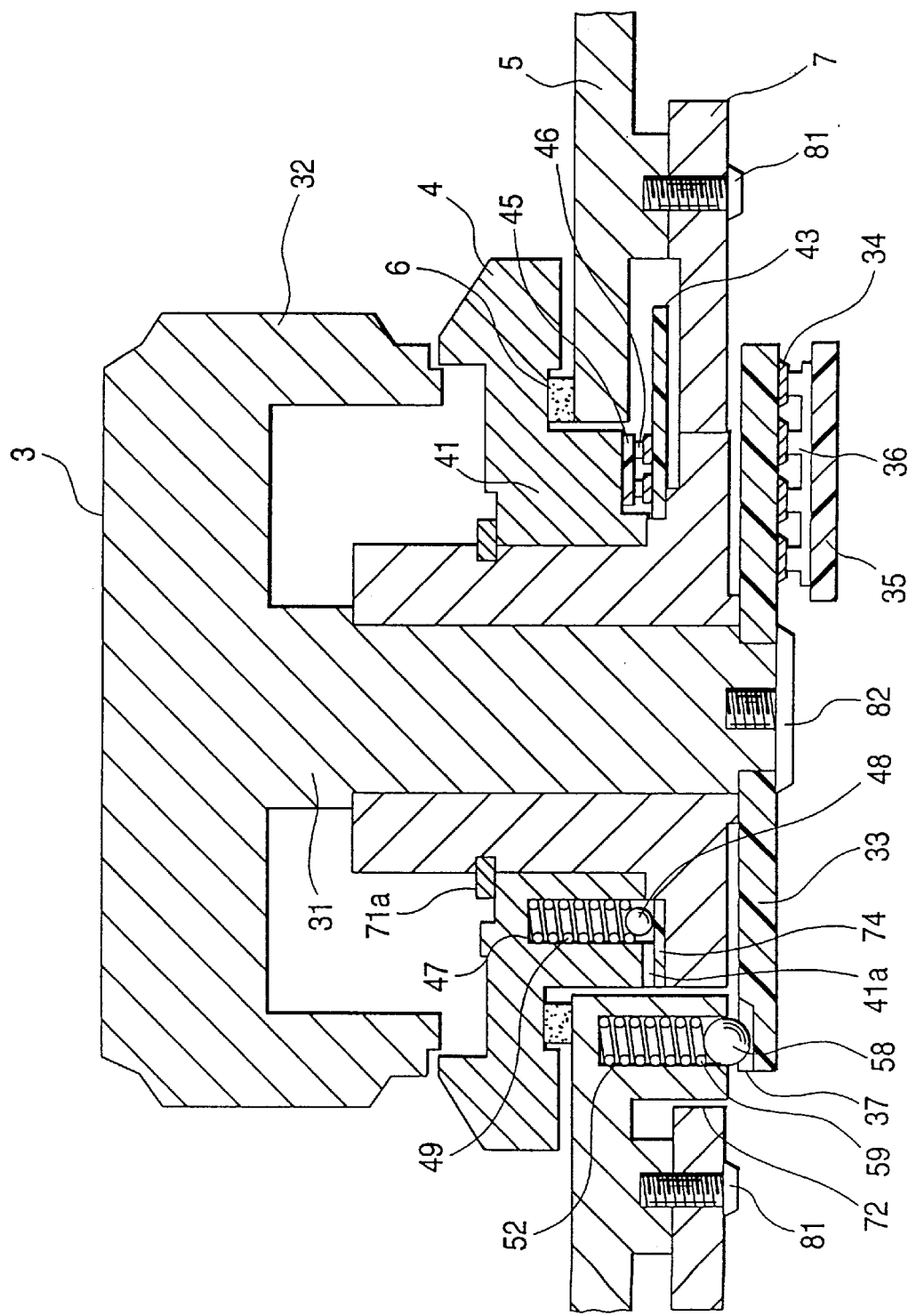
FIG. 3 is a longitudinal cross-sectional view of the assembled condition of the double dial mechanism of the present invention.
Figure 4A:
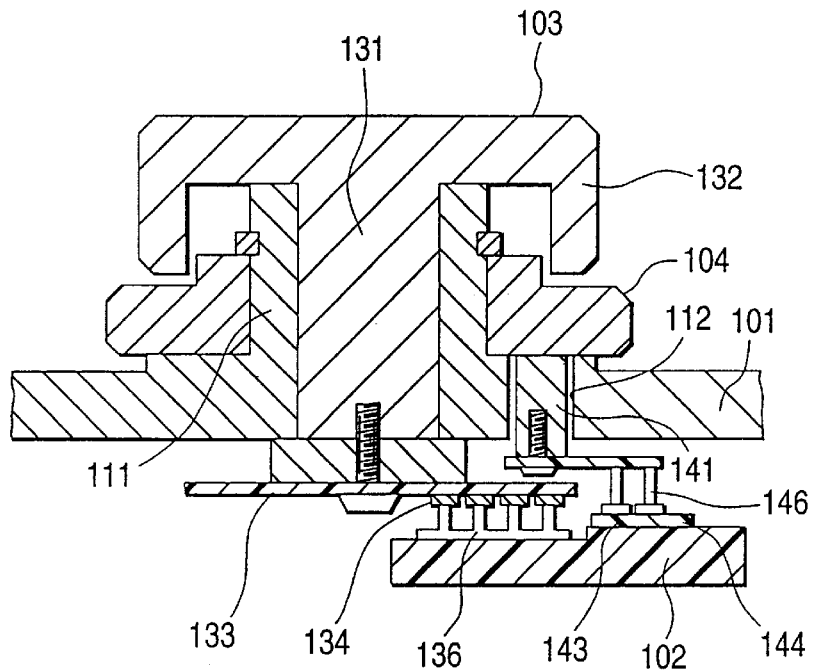
FIG. 4A is a longitudinally cross-sectional view showing an example of the conventional double dial mechanism.
Figure 4B:
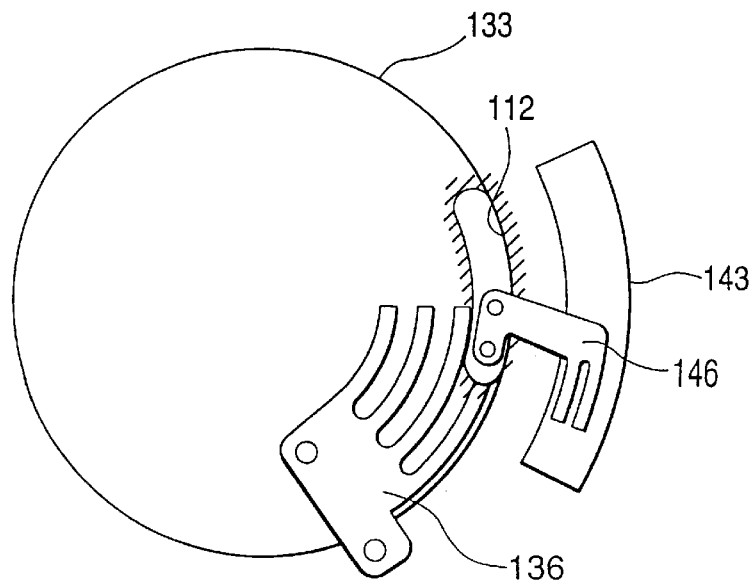
FIG. 4B is a schematic plan view showing an arrangement of the primary portion of the conventional double dial mechanism.

Referring to the accompanying drawings, an embodiment of the present invention will be explained below. FIG. 1 is a perspective view of a single-lens reflex camera to which the double dial mechanism of the present invention is applied. In a top body panel 2 of the camera body 1, there are provided a shutter dial 3 and a photometry dial 4 that are arranged on the same axis. The shutter dial 3 is used for manually changing a shutter speed when it is rotated. The photometry dial 4 is used for changing the photometry mode between an evaluation mode, a mode of placing emphasis on the center and a spot mode. FIG. 2 is an exploded perspective view of a primary portion of this double dial mechanism. FIG. 3 is a longitudinal cross-sectional view showing an assembled condition of this double dial mechanism. In a portion of the ornamental plate 5 composing the top body panel 2 of the camera body 1 in which the above double dial mechanism is arranged, there is formed an opening window 51 for communication between the inside and the outside of the camera body 1. A support base plate 7 is fixed to the inner surface of the ornamental plate 5 by screws 81 so that the support base plate 7 can cover this opening window 51 from the inside of the camera body 1. A cylindrical boss 71 is integrally formed on this support base plate 7. This cylindrical boss 71 protrudes outside the ornamental plate 5 through the opening window 51.

An inner end portion of a shaft portion 31 of the shutter dial 3 is inserted into the above-described cylindrical boss 71. At an outer end portion of this shaft portion 31 of the shutter dial 3, there is provided a short cylindrical dial knob 32 used for rotational operation, and this short cylindrical dial knob 32 is integrated with the shaft portion 31. At an inner end portion of the shaft portion 31 located inside the ornamental plate 5, a shutter code plate 33 is fixedly attached to the shaft portion 31 by screws 82. In the same manner as that of the conventional arrangement, a conductor pattern 34, used for the shutter and composed of a conductor film having a predetermined pattern, is formed on a lower surface of the shutter code plate 33, which faces the inside of the camera body 1. A conductive shutter brush 36, attached to the shutter brush plate 35 supported, is capable of sliding on this conductor pattern 34 used for the shutter. The conductor pattern 34 and the shutter brush 36 form a shutter dial rotational position detecting mechanism together with the shutter code plate 33 and the shutter brush plate 35. When the shutter dial 3 is rotated during operation, the conductor pattern 34 provided on the shutter code plate 33, which is rotated integrally with the shutter dial 3, is slid with respect to the shutter brush 36. As a result of this operation, the contact condition between the conductor pattern 34 and the shutter bush 36 is changed, resulting in a change in the code value. Due to the foregoing, the rotational position of the shutter dial 3 is electrically detected, and the shutter speed is set in accordance with the rotational position.

A plurality of click grooves 37 are formed in the circumferential direction at regular intervals in a circumferential portion of the reverse side of the shutter code plate 33. The reverse side of the shutter code plate 33 faces the support base plate 7. A click ball 58 supported on the inner surface of the ornamental plate 5 is engaged with one of these click grooves 37 through a hole 72 formed in a portion of the support base plate 7. This click ball 58 is provided together with a spring 59 in a cylindrical blind hole 52 formed on the inner surface of the ornamental plate 5. The click ball 58 is elastically contacted with the click groove 37 by an elastic force of this spring 59. Due to this arrangement, when an operator rotates the shutter dial 3 and the integrally formed shutter code plate 33, the click ball 58 successively contacts adjacent click grooves 37. As a result, the operator indirectly feels a click through the shutter dial 3, so that the shutter dial 3 can be positioned at each rotational position.

The disk-shaped photometry dial 4 is rotatably engaged with an outer circumference of the cylindrical boss 71 into which the shaft portion 31 of the shutter dial 3 is inserted. A thick boss portion 41 is provided at the center of this photometry dial 4. A shaft hole 42 formed in this boss portion 41 is engaged with the outside of the cylindrical boss 71. An axial position of this photometry dial 4 is restricted by an annular stopper 71a attached to a portion of the outer circumferential portion of the cylindrical boss 71 in the axial direction thereof. At a position on an upper surface of the support base plate 7 and opposed to the above thick boss portion 41, an arcuate photometry code plate 43, the arc center of which coincides with the axis of the photometry dial 4, is fixed between the inner surface of the ornamental plate 5 and the upper surface of the support base plate 7. In the same manner as that of the shutter code plate 33, on an upper surface of this photometry code plate 43, there is provided a photometry conductor pattern 44 composed of a conductor film having a predetermined pattern. On a lower surface of a portion of the circumference of the boss portion 41 of the photometry dial 4, which faces the photometry code plate 43, there is fixed a photometry brush plate 45 opposing the photometry code plate 43. A conductive photometry brush 46 attached to this photometry brush plate 45 is slidably contactable with the photometry code plate 43. The photometry code plate 43 and the photometry brush plate 45 compose the photometry dial rotational position detecting mechanism. This photometry dial rotational position detecting mechanism and the shutter dial rotational position detecting mechanism are arranged in such a manner that they overlap each other in the radial direction. When the photometry dial 4 is rotated during operation, the photometry brush 46 rotated integrally with the photometry dial 4 slides on the photometry conductor pattern 44 on the photometry code plate 43, thereby changing the contact state. As a result, a rotational position of the photometry dial 4 can be electrically detected as a change in code value, and a photometry correction value is set in accordance with the rotational position.

In a portion of the boss portion 41 of the photometry dial 4, there is provided a blind hole 47 on the side opposing the support base plate 7. A spring 49 and click ball 48 are supported in this blind hole 47. On an upper surface of the support base plate 7 corresponding to this click ball 48, an arcuate thick plate portion 73 is integrally provided along the circumferential direction. In this thick plate portion 73, there are provided a plurality of click grooves 74 in the circumferential direction. These click grooves 74 compose a click mechanism that works in cooperation with the click ball 48. This click mechanism determines a rotational operating position of the photometry dial 4. In the boss portion 41, there are provided a pair of protrusions 41a capable of coming into contact with end surfaces of both ends of the thick plate portion 73 in accordance with a predetermined rotational operation of the photometry dial 4. When these protrusions 41a are in contact with the end surfaces of the thick plate portion 73, the maximum rotation of the photometry dial 4 is restricted. An annular sealing member 6 having a diameter larger than the diameter of the opening window 51 is made to adhere to a lower surface of the photometry dial 4 opposing the ornamental plate 5. When this sealing member 6 is in close contact with the upper surface of the ornamental plate 5 in the periphery of the opening window 51, water proofing can be accomplished between the photometry dial 4 and the ornamental plate 5.

In this double dial mechanism, when the dial knob 32 of the shutter dial 3 is manually rotated, the shaft portion 31 of the shutter dial 3 is rotated in the cylindrical boss 71. Therefore, the shutter code plate 33 integrated with the shaft portion 31 is rotated. Due to the foregoing, the conductor pattern 34 for the shutter of the shutter code plate 33 is slidably rotated with respect to the shutter brush 36 fixed in the camera body. Accordingly, a code value of the conductor pattern 34 for the shutter is output corresponding to the rotational position. When this code value is output as a shutter speed signal into a control circuit not shown in the drawing, a shutter speed is set corresponding to the rotational position of the shutter dial 3. At this time, the rotational position of the shutter dial 3 is determined by the click mechanism composed of the click grooves 37 and the click ball 58. Accordingly, it is possible to position the shutter dial 3 at a rotational position corresponding to each code of the conductor pattern 34 for the shutter. Further, it is possible to stably maintain the rotational position.

When the photometry dial 4 is manually rotated, the photometry brush 46 integrated with the boss portion 41 slides on the photometry conductor pattern 44 on the photometry code plate 43, and its contacting state is changed. Therefore, a code value of the photometry conductor pattern 44 corresponding to the rotational position is generated in the photometry brush 46. When this code value is output as a photometry correction value signal into a control circuit not shown in the drawing, a photometry correction value corresponding to the rotational position of the photometry dial 4 can be set. At this time, the rotational position of the photometry dial 4 is determined by the click mechanism composed of the click grooves 74 and the click ball 48. Therefore, the photometry dial 4 is positioned at a rotational position corresponding to each code of the photometry pattern 44, and the rotational position can be stably maintained. In this case, the maximum rotation of the photometry dial 4 is restricted by the contact of the protrusion 41a with the thick plate portion 73.

As described above, in this double dial mechanism, the shutter dial 3 and the photometry dial 4 are coaxially arranged. Therefore, it is possible to arrange two dials in the camera body without requiring additional space in which the dials are to be arranged. Due to the foregoing, it is possible to realize the miniaturization of the camera without deteriorating the operation property of the dials. In this double dial mechanism, the rotational position detecting mechanisms used for the shutter and photometry, which are respectively composed of the brush plates 36, 46 and the code plates 33, 43, are arranged at positions different from each other in the axial direction. That is, the rotational position detecting mechanisms used for the shutter and photometry are arranged on planes different from each other. Accordingly, no interference is caused between the two detecting mechanisms. Further, it is possible to arrange the rotational position detecting mechanisms at positions that overlap each other in the radial direction. For the above reasons, it is possible to reduce a space in the camera body occupied by the rotational position detecting mechanisms. Therefore, the miniaturization of the camera may be further advanced.

In the mechanism of this embodiment, the photometry code plate 43 for detecting the rotational position of the photometry dial 4 is mounted on the support base plate 7 fixed on the ornamental plate 5. The photometry brush 46 provided in the photometry dial 4 is contacted by the code plate 43 through the opening window 51 formed in the ornamental plate 5. Therefore, unlike the conventional arrangement, it is not necessary to provide an arcuate opening groove in the ornamental plate 5. On the other hand, in the mechanism of this embodiment, the ornamental plate 5 is integrated with the support base plate 7, provided that the opening window 51 formed on the ornamental plate 5 is covered by the support base plate 7 from the inside. Accordingly, even if the opening window 51 is formed, the mechanical strength is not deteriorated, and the mechanical strength is enhanced as compared with -the conventional arrangement in which the conventional opening groove is provided. Further, the annular sealing member 6 for sealing the opening window 51 is adhered between the photometry dial 4 and the ornamental plate 5. Therefore, not only are the water proofing properties of the opening window 51 and the photometry brush 46 enhanced, so is the water proofing property of the entire camera. Since the structure for restricting the rotational angle of the photometry dial 4 is composed of the thick plate portion 73 provided on the support base plate 7 and the protrusion 41a provided on the photometry dial 4, the rotational angle can be freely set irrespective of the mechanical strength of the camera body. Accordingly, it is possible to ensure a rotational angle required when the photometry condition is changed.

The double dial mechanism of the present invention is not limited to the combination of the shutter dial with the photometry dial that is adopted in the above-described embodiment. The double dial mechanism may be setting dials of any function. In the above-described embodiment, the shutter brush plate 35 is independently supported in the camera body. However, it is possible to fix this shutter brush plate on the support base plate 7, and the shutter code plate 33 on a surface opposing the support base plate 7. This arrangement is effective in reducing the number of required parts.

As described above, the present invention provides the following effects. Two dials are coaxially arranged in a camera body, and two rotational position detecting mechanisms arranged in the two dials are arranged at positions that are different from each other in the axial direction and overlap each other in the radial direction. Due to the above arrangement, the two dials are coaxially arranged, and therefore spaces in which the two dials and in which the two rotational mechanisms are arranged can be reduced. As a result, a space occupied by the double dial mechanism in the camera can be greatly reduced, and the miniaturization of the camera can be accomplished. When the first and the second dials are coaxially supported on the support base plate 7 closing the opening window formed in the camera body, and when the rotational position detecting mechanism of the second dial is arranged between the dial and the support base plate, the rotational position detecting mechanisms can be arranged at positions which are different from each other in the axial direction and overlap each other in the radial direction. Further, it is unnecessary to provide an opening for driving the rotational position detecting mechanism of the second dial in the camera body. Therefore, both the mechanical strength and the water proofing property of the camera can be enhanced.

The entire disclosure of each and every foreign patent application from which the benefit of foreign priority has been claimed in the present application is incorporated herein by reference, as if fully set forth.

While only certain embodiments of the invention have been specifically described herein, it will apparent that numerous modifications may be made thereto without departing from the spirit and scope of the invention.

What is claimed is:

1. A double dial mechanism for a camera, the camera including a camera body with an opening window formed therein, a support base plate supported inside the camera body and closing the window opening and a cylindrical boss protruding from the support base plate through the opening window, the double dial mechanism comprising:

first and second coaxially-arranged rotatable dials; and first and second dial rotational position detecting mechanisms;

wherein said first and said second dial rotational position detecting mechanisms are located at a constant radial distance from a center of said coaxially rotatable dials;

a shaft portion provided on said first dial, said shaft portion extending into and being supportable by the cylindrical boss, and said second dial engaging with an outer circumference of the cylindrical boss;

said first rotational position detecting mechanism being arranged at an inner end portion of said shaft portion of said first dial, said inner end portion being positioned within the camera body; and said second rotational position detecting mechanism being arranged between said second dial and the support base plate.

2. The double dial mechanism according to claim 1, wherein said first and second dial rotational position detecting mechanisms detect rotational positions of said first and second dials, respectively.

3. The double dial mechanism according to claim 1, further comprising a sealing member sealing a circumference of the opening window and being arranged between said second dial and the camera body.

4. The double dial mechanism according to claim 1, wherein said first rotational position detecting mechanism includes:

a first code plate arranged on one of said shaft portion and the camera body and having a conductor pattern, a shape of said conductor pattern changing in the circumference direction; and a first brush plate arranged on the other of said shaft portion and the camera body and being in slidable contact with the conductor pattern of said first code plate;

wherein said second rotational position detecting mechanism includes:

a second conductor plate arranged on one of said second dial and the support base plate and having a conductor pattern, a shape of said conductor pattern changing in the circumferential direction; and a second brush plate arranged on the other of said second dial and the support base plate and being in slidable contact with the conductor pattern of said second code plate.

5. The double dial mechanism according to claim 4, wherein, in said first rotational position detecting mechanism, said first code plate is arranged on said shaft portion, and said first brush plate is arranged on the camera body; and wherein, in said second rotational position detecting mechanism, said second code plate is arranged on the support base plate, and said second brush plate arranged on said second dial.

6. The double dial mechanism according to claim 4, further comprising a sealing member sealing a circumference of the opening window and being arranged between said second dial and the camera body.

7. The double dial mechanism according to claim 4, further comprising a first click mechanism for determining a rotational position of said first dial and arranged between said first code plate and the camera body.

8. The double dial mechanism according to claim 1, further comprising a second click mechanism for determining a rotational position of said second dial and arranged between said second dial and the support base plate.

9. The double dial mechanism for a camera according to claim 1, said first and second dial rotational position detecting mechanisms are spaced along an axis of rotation of said first and second coaxially arranged rotatable dials.

10. The double dial mechanism according to claim 1, said first rotational position detecting mechanism including a first code plate and said second rotational position detecting mechanism including a second code plate, at least a portion of said first and second code plates being positioned at a common radial distance from a center of said coaxially arranged rotatable dials.

11. The double dial mechanism for a camera according to claim 1, said first rotational position detecting mechanism including a first code plate and said second rotational position detecting mechanism including a second code plate, said first and second code plates being oriented to face in opposite directions along an axis of rotation of said first and second coaxially arranged rotatable dials.

* * * * *